United States Patent [19]
Stuhlreyer

[11] Patent Number: 5,727,598
[45] Date of Patent: Mar. 17, 1998

[54] PIPE WALL SEGMENT AND PIPE HAVING SIDEWALL

[75] Inventor: Mark Stuhlreyer, Columbus, Ohio

[73] Assignee: Advanced Drainage Systems, Inc., Columbus, Ohio

[21] Appl. No.: 547,960

[22] Filed: Oct. 25, 1995

Related U.S. Application Data

[63] Continuation of Ser. No. 54,290, Apr. 30, 1993, abandoned.

[51] Int. Cl.⁶ .................................................. F16L 11/24
[52] U.S. Cl. ........................ 138/129; 138/154; 138/172; 138/177; 138/148
[58] Field of Search ............................... 156/111, 115, 156/129, 154, 172, 174, 177, 178, 148, 187

[56] References Cited

U.S. PATENT DOCUMENTS

| | | | |
|---|---|---|---|
| 789,730 | 5/1905 | Hinton | 138/115 |
| 1,023,530 | 4/1912 | Schofer | 138/115 |
| 1,093,766 | 4/1914 | Campfield | 138/115 |
| 1,166,405 | 12/1915 | Ayer et al. | 138/115 |
| 1,654,631 | 1/1928 | Bevier | 138/115 |
| 1,720,306 | 7/1929 | Tremper | 138/115 |
| 1,945,681 | 2/1934 | Farrens | 138/115 |
| 2,041,243 | 5/1936 | Gottwald | 138/115 |
| 2,276,431 | 3/1942 | Stewart | 138/115 |
| 3,495,628 | 2/1970 | Boender . | |
| 3,585,910 | 6/1971 | Brown | 138/115 |
| 3,679,531 | 7/1972 | Wienand et al. | 138/154 |
| 3,917,500 | 11/1975 | Petzetakis et al. . | |
| 3,926,223 | 12/1975 | Petzetakis . | |
| 4,033,808 | 7/1977 | Petzetakis . | |
| 4,428,591 | 1/1984 | Marissen et al. . | |
| 4,461,323 | 7/1984 | Morikawa et al. . | |
| 4,531,551 | 7/1985 | Eichelberger et al. | 138/154 |
| 4,753,833 | 6/1988 | Fishgal et al. . | |
| 4,903,736 | 2/1990 | Baston et al. | 138/129 |
| 5,060,698 | 10/1991 | Anastassakis et al. | 138/154 |

FOREIGN PATENT DOCUMENTS

| | | | |
|---|---|---|---|
| 565101 | 7/1960 | Belgium | 138/129 |

OTHER PUBLICATIONS

"Large Bore Helidur Spiral Sewer Pipes Made of uPVC 100 or HDPE" by A. G. Petzetakis S.A.—Sep. 1983.

Primary Examiner—David Scherbel
Assistant Examiner—James F. Hook
Attorney, Agent, or Firm—Kremblas, Foster, Millard & Pollick

[57] ABSTRACT

An improved pipe construction is disclosed having an inner and outer surface, intermediate walls having a top and bottom, and a plurality of primary internal cells. Each of the primary internal cells has a cell surface wall, collapsible ribs attached to the intermediate walls, collapsible apertures positioned on opposite sides of the intermediate walls and apertures, and internal flanks. Each of the collapsible apertures has an inner wall surface, with each inner wall surface having a deformable surface portion. Each of the end apertures is positioned between the collapsible apertures and primary internal cells. Each of the end apertures has an inner wall surface. The internal flanks are positioned intermediate the end apertures and the collapsible apertures. A method of forming the pipe of this structure is also disclosed.

20 Claims, 6 Drawing Sheets

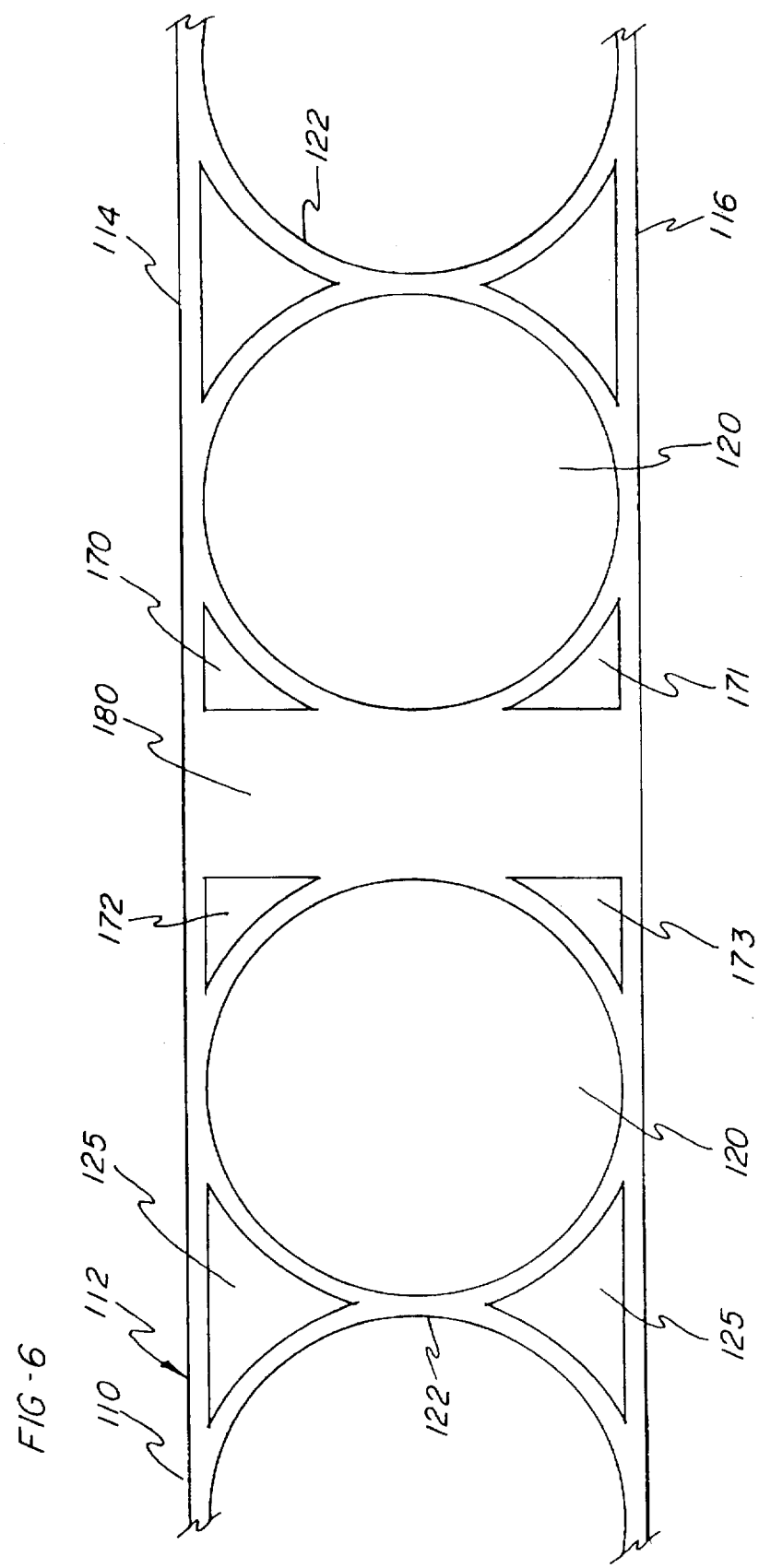

PIPE WALL SEGMENT AND PIPE HAVING SIDEWALL

This is a continuation application based upon Ser. No. 08/054,290 filed Apr. 20, 1993 now abandoned.

BACKGROUND OF THE INVENTION

The present invention relates generally to plastic pipe, and more particularly, pipe wall construction having apertures formed within the pipe wall.

A number of inventions have been made concerning pipe and more particularly plastic pipe, with regard to the cross sectional configuration of such pipe. One of the primary concerns of pipe manufacturers is the cost associated with the plastic used to fabricate pipe. Another of the concerns is structural stability, such that the pipe possesses adequate strength to resist collapsing, especially, for example, in applications where the pipe is buried underground.

Attempts have been made to fabricate pipe with apertures being formed within the pipe so as to reduce the total amount of plastic necessary for fabrication. Marissen et al, U.S. Pat. No. 4,428,591, and Morikawa et al, U.S. Pat. No. 4,461,323, both disclose pipe with a plurality of longitudinally extending channels which extend parallel to the longitudinal axis of the pipe assembly. Petzetakis, U.S. Pat. No. 3,926,223, discloses a pipe assembly formed from a spirally wound tube incorporating one of a variety of differently shaped apertures. The finished pipe consisted of a multiplicity of helical turns of an extruded strip with the strip having a single aperture therein. The lateral surfaces of the strip had to be relatively thick in order to maintain the integrity of the pipe.

Boender, U.S. Pat. No. 3,495,628, discloses a variety of tubular constructions comprising a wound strip or pipe wall segment having a plurality of apertures formed therein. The tubular construction of Bender required the pipe segment to have an outer marginal edge coacting with and overlapping a portion of the outer wall of the pipe segment, along with an inner marginal edge coacting with and overlapping a portion of the inner wall of the pipe segment.

While Petzetakis and Boender, from a theoretical standpoint, appear to result in pipe having continuous smooth inner and outer wall surfaces, and in pipe requiring substantially less plastic, resulting in pipes of equal strength, repeated attempts to fabricate pipe of a cross-section similar to Boender, and then wind the pipe segment in a spiral so as to form a finished tube disclosed that the inner and outer walls exhibited a tendency to bend or otherwise result in an inappropriate quality of fabrication. Furthermore, the single aperture bodies of Petzetakis resulted in a plastic pipe which still required an unacceptably high amount of plastic.

Research into the formation of an improved embodiment of a pipe wall segment attempted to modify the overlapping marginal edges of Boender, such that the opposing side edges of the pipe wall segment were generally "s-shaped" so as to cooperate with adjacent lateral edge surfaces. However, it was discovered that this pipe segment design resulted in sidewalls which collapsed and deformed, thereby resulting in pipe failure. The pipe lacked structural integrity, and in addition the finished tube looked bad.

It is thus apparent that the need exists for an improved pipe wall segment or the like which provides a structure capable of making an aesthetically and structurally pleasing plastic pipe. Additionally, it is apparent that the need exists for a method for forming the pipe having the aforementioned improved pipe wall segment structure.

SUMMARY OF THE INVENTION

The problems associated with the prior plastic pipe and manner of making the same are overcome in accordance with the present invention by forming a pipe wall segment having a top surface, a bottom surface, side edge walls having a top and a bottom, a plurality of primary internal cells, each of such primary cells having a cell surface wall, at least one collapsible rib projecting inwardly from the side edge walls, a pair of internal flanks positioned inwardly of each side edge wall, at least two collapsible apertures, each of the collapsible apertures having an inner wall surface, each of the inner wall surfaces having a deformable surface portion, and at least two end apertures, each of the end apertures having an inner wall surface. Preferably the end apertures are positioned between the collapsible apertures and the primary internal cells. Additionally, preferably two collapsible ribs project inwardly from the side edge walls.

Preferably the pipe wall segment has three collapsible apertures positioned adjacent each side edge wall. Furthermore, the end apertures are preferably positioned between the collapsible apertures and the primary internal cells. Additionally, the pipe wall segment includes a plurality of secondary internal cells. Preferably the primary internal cells are of a circular cross-section. Furthermore, preferably at least two of the collapsible apertures are of a rectangular cross-section.

There is also disclosed a method for forming pipe comprising the steps of forming a pipe wall segment, spirally winding around an axis and elongated strip of the pipe wall segment, and causing adjacent side edge walls of the wound elongated strip to come into contact with and to physically bond to each other so as to form a finished pipe having generally continuous smooth inner and outer wall surfaces.

The pipe wall segment formed comprises a top surface, a bottom surface, side edge walls having a top and a bottom, a plurality of primary internal cells, with each of the primary internal cells having a cell surface wall, at least one collapsible rib projecting inwardly from the side edge walls, a pair of internal flanks positioned inwardly of each side edge wall, at least two collapsible apertures, each of the collapsible apertures having an inner wall surface, each of the inner wall surfaces having a deformable surface portion, and at least two end apertures, with each of the end apertures having an inner wall surface.

Preferably the end apertures are positioned between the collapsible apertures and the primary internal cells. Additionally, the pipe wall segment preferably includes two collapsible ribs projecting inwardly from the side edge walls. More preferably the pipe wall segment also includes three collapsible apertures positioned adjacent each side edge wall. Preferably the pipe wall segment includes a plurality of secondary internal cells. Further, the primary internal cells are preferably of a circular cross-section and at least two of the collapsible apertures are of a rectangular cross-section.

There is also disclosed a pipe having a sidewall with the sidewall having an inner surface, an outer surface, intermediate walls having a top and a bottom, a plurality of primary internal cells, each of such primary internal cells having a cell surface wall, collapsible ribs attached to the intermediate walls, collapsible apertures positioned on opposite sides of the intermediate walls, each of the collapsible apertures having an inner wall surface, each of the inner wall surfaces having a deformable surface portion, end apertures positioned between the collapsible apertures and the primary internal cells, each of the end apertures having an inner wall surface, and internal flanks positioned intermediate the end apertures and the collapsible apertures. Preferably the sidewall has three collapsible apertures positioned directly adjacent opposite sides of the intermediate walls. Additionally, the sidewall includes a plurality of secondary internal cells. Furthermore, the primary internal cells are preferably of a circular cross-section.

There is also disclosed a pipe wall segment having a top surface, a bottom surface, side edge walls having a top and a bottom, a plurality of primary internal cells, each of such primary cells having a cell surface wall, each of said primary internal cells having a cell surface wall, and at least two end apertures, each of said end apertures having an inner wall surface, said primary internal cells being larger in size than said end apertures. Additionally, the pipe wall segment includes a plurality of secondary internal cells. Preferably the primary internal cells are of a circular cross-section. Preferably the secondary internal cells are of a generally triangular cross-section. Preferably the side edge walls are of a first thickness and the cell surface walls are of a second thickness, with the first thickness being greater than the second thickness.

There is also disclosed a method for forming pipe comprising the steps of forming a pipe wall segment, spirally winding around an axis an elongated strip of the pipe wall segment, and causing adjacent side edge walls of the wound elongated strip to come into contact with and to physically bond to each other so as to form a finished pipe having generally continuous smooth inner and outer wall surfaces.

The pipe wall segment formed comprises a top surface, a bottom surface, side edge walls having a top and a bottom, a plurality of primary internal cells, with each of the primary internal cells having a cell surface wall, and at least two end apertures, each of said end apertures having an inner wall surface, said primary internal cells being larger in size than said end apertures. Preferably the pipe wall segment includes a plurality of secondary internal cells. Further, the primary internal cells are preferably of a circular cross-section and the secondary internal cell are of a generally triangular cross-section.

There is also disclosed a pipe having a sidewall with the sidewall having an inner surface, an outer surface, intermediate walls having a top and a bottom, a plurality of primary internal cells, each of such primary internal cells having a cell surface wall, and at least two end apertures, each of said end apertures having an inner wall surface, said primary internal cells being larger in size than said end apertures. Preferably the side edge walls are of a first thickness and the cell surface walls are of a second thickness, with the first thickness being greater than the second thickness.

FIG. 2 is a vertical cross-sectional view on a greatly enlarged scale of the pipe wall segment of the present invention.

FIG. 3 is a partial vertical sectional view on a greatly enlarged scale taken along the juncture of adjacent lateral sidewalls after the finished pipe is made in accordance with the present invention.

FIG. 4 is a perspective view of a pipe formed from the pipe wall segment of the preferred embodiment of the present invention.

FIG. 5 is a vertical cross-sectional view on a greatly enlarged scale of the preferred embodiment of the pipe wall segment of the present invention.

FIG. 6 is a partial vertical sectional view on a greatly enlarged scale taken along the juncture of adjacent lateral sidewalls after the finished pipe is made in accordance with the preferred embodiment of the present invention.

DETAILED DESCRIPTION OF THE INVENTION

Having reference to the drawings, attention is directed first to FIG. 1, which discloses a perspective view of part of a pipe made in accordance with the present invention and fabricated from a pipe wall segment having the structure of the present invention as shown in FIGS. 2 and 3, with the pipe designated generally by the numeral 10. Pipe 10 is comprised of a wall 12 having an inner surface 14 and an outer surface 16.

As can be seen by reference to FIGS. 2 and 3 as well, the inner surface 14 corresponds to the top of the pipe wall segment structure, while the outer surface 16 corresponds to the bottom of the pipe wall segment structure of this invention. Each pipe wall segment also includes a pair of sidewalls 18. Preferably the sidewalls are planar and parallel to each other.

As can be seen by the drawings figures, the pipe formed by this invention has within each pipe wall segment a plurality of primary internal cells 20, preferably three in number. These primary internal cells are preferably of a circular cross-section and more preferably are about 2" or 3" in diameter. Each primary internal cell 20 has a cell surface wall 22.

Additionally, the pipe wall segment made in accordance with the present invention preferably has formed therein a plurality of secondary internal cells 25. Each of the secondary internal cells 25 has a cell surface wall 27. As can be seen the top surface 14, while the other intersects and is perpendicular to the bottom surface 16.

Collapsible apertures 45a and b, 46a and b, and 47a and b are located adjacent the side edge walls 18. First collapsible apertures 45a and b are located between the internal flank, the collapsible rib, the sidewall 18, and the inner surface 14. Second collapsible apertures 46a and b are located between the internal flank 40, the collapsible rib 45, the sidewall 18, and the outer surface 16. Finally, the third collapsible apertures 47a and b are located between the pair of collapsible ribs 35 which project inwardly from common sidewall 18, the sidewall 18 itself, and the cell surface wall 22 of that primary internal cell 20 which is adjacent to the aforementioned respective sidewall 18. Each of the first, second and third collapsible apertures 45a and b, 46a and b, and 47a and b respectively comprise inner wall surfaces 50a and b, 51a and b, and 52a and b respectively. Furthermore, at least two of the collapsible apertures are preferably rectangular in cross-section.

In forming the finished pipe, with respect to the embodiments shown in FIGS. 2 and 3, upon the application of heat to the adjacent lateral sidewalls 18 during the winding of the pipe wall segment structure of this invention, the respective inner wall surfaces 50a and b, 51a and b, and 52a and b, have deformable surface portions 55a and b, 56a and b, and 57a and b respectively react to and yield to the heat and the exerted axial pressure applied during the construction of the finished pipe. In contrast to the yielding of the deformable surface portions 55a and b, 56a and b, and 57a and b, the internal flanks 40 as well as the individual cell surface walls 22 remain rigid and essentially unaffected by the heating and the exertion of axial pressure.

Additionally, the pipe wall segment of this invention as shown in FIGS. 2 and 3 has formed therein end apertures 70, 71, 72 and 73, with each end aperture having a respective inner wall surface 75, 76, 77 and 78. The end apertures are positioned between the collapsible apertures and the primary internal cells. Preferably the end apertures are of a generally trilateral cross-section, although upon closer inspection it will be noted that the end apertures preferably each have four sides.

Thus, this invention permits the forming of a pipe having a sidewall with an inner surface, an outer surface, and intermediate walls 80 having both a top and a bottom with the intermediate walls being formed where the lateral sidewalls melt. Preferably this heating is done independently at the time of coiling so that the adjacent lateral sidewalls mesh or physically bond together. The pipe so formed has a plurality of primary internal cells each having a cell surface wall. Additionally, the pipe has collapsible ribs attached to the intermediate walls. Collapsible apertures are positioned on opposite sides of the intermediate walls with each of the collapsible apertures having an inner wall surface and with each of the inner wall surfaces having a deformable surface portion.

Furthermore, the pipe formed by this invention has end apertures positioned between the collapsible apertures and the primary internal cells. Each of the end apertures has an inner wall surface. Additionally, the pipe has internal flanks positioned intermediate the end apertures and the collapsible apertures. Preferably the sidewall 12 comprises three collapsible apertures positioned directly adjacent opposite sides of the intermediate walls. Additionally, the sidewall 12 comprises a plurality of secondary internal cells. The pipe formed using the method described below results in a pipe which may be formed so as to have an outside diameter of 30" and 36" where the inside diameter of the primary internal cells is 2", and a pipe having an outer diameter of at least 42" where the primary internal cells are about 3" in diameter.

The best mode of the invention is disclosed in FIGS. 4–6. For example, FIG. 4 discloses a perspective view of part of a pipe made in accordance with the preferred embodiment of the present invention and fabricated from a pipe wall segment having the structure of the present invention as shown in FIGS. 5 and 6, with the pipe designated generally by the numeral 100. Pipe 100 is comprised of a wall 112 having an inner surface 114 and an outer surface 116.

As can be seen by reference to FIGS. 5 and 6 as well, the inner surface 114 corresponds to the top of the pipe wall segment structure, while the outer surface 116 corresponds to the bottom of the pipe wall segment structure of this invention. Each pipe wall segment also includes a pair of sidewalls 118. Preferably the sidewalls are planar and parallel to each other. Additionally, each sidewall 118 extends in a single plane from inner surface 114 to outer surface 116.

As can be seen by the drawings figures, the pipe formed by this invention has within each pipe wall segment a plurality of primary internal cells 120, preferably three in number. These primary internal cells are preferably of a circular cross-section and more preferably are between 2" or 3" in diameter, and in the best mode are 2.48" in diameter. Each primary internal cell 120 has a cell surface wall 122.

Additionally, the pipe wall segment made in accordance with the present invention preferably has formed therein a plurality of secondary internal cells 125. Each of the secondary internal cells 125 has a cell surface wall 127. As can be seen best in FIGS. 5 and 6, the secondary internal cells are roughly triangular in cross-section. For purposes of this invention, the terminology "roughly" or "generally triangular" is meant to include the trilateral shapes shown in the drawings. With respect to the sidewalls 118, FIG. 5 discloses that each sidewall 118 is comprised of a top portion 130, which is directly adjacent the inner surface 114, and a bottom portion 132 which is directly adjacent the outer surface 116. Each side edge wall 118 is of a thickness which is greater than the thickness of the cell surface walls 122. Also, the distance between the outer surface of each side edge wall and the adjacent primary internal cell is preferably less than the distance between the outer surface of the same side edge wall and any adjacent end aperture.

In forming the finished pipe, with respect to the preferred embodiments shown in FIGS. 5 and 6, upon the application of heat to the adjacent lateral sidewalls 118 during the winding of the pipe wall segment structure of this invention, the respective adjacent lateral sidewalls 118 react to and yield to the heat and the exerted axial pressure applied during the construction of the finished pipe. In contrast, the individual cell surface walls 122 remain rigid and essentially unaffected by the heating and the exertion of axial pressure.

Additionally, the pipe wall segment of this invention as shown in FIGS. 5 and 6 has formed therein end apertures 170, 171, 172 and 173, with each end aperture having a respective inner wall surface 175, 176, 177 and 178. Preferably the end apertures are of a generally trilateral cross-section. Also, preferably the primary internal cells are larger in size than the end apertures, as well as being larger in size than the secondary internal cells.

Thus, this invention permits the forming of a pipe having a sidewall with an inner surface, an outer surface, and intermediate walls 180 having both a top and a bottom with the intermediate walls being formed where the lateral sidewalls melt. Preferably this heating is done independently at the time of coiling so that the adjacent lateral sidewalls mesh or physically bond together. The pipe so formed has a plurality of primary internal cells each having a cell surface wall. Additionally, the sidewall 112 comprises a plurality of secondary internal cells. The pipe formed using the method described below results in a pipe which may be formed so as to have an outside diameter of 36" to 60" where the inside diameter of the primary internal cells is 1.3"–2.48" for 36" pipe, 2.6"–2.8" for 48" pipe and 2.8"–3.5" for 60" pipe.

Although dimensions associated with the pipe will vary based upon pipe size, in one embodiment of the invention the total width of a pipe wall segment is 6" and its height is 2". The primary internal cells have an inner diameter of 1.8". The thickness of the inner and outer surfaces 114 and 116 is 0.1". The secondary internal cells have one side measuring 1" and the other two measuring 0.7". The sidewall 118 thickness is 0.2", or at least twice that of the inner and outer surfaces. Finally, the three longest sides associated with the end apertures measure 0.35", 0.45" and 0.55", with the first dimension being adjacent the sidewall, and the third dimension being adjacent the primary internal cell.

The sidewalls 118 are parallel to each other. They preferably are perpendicular to the inner and outer surfaces, however the pipe segment for use with the 48" and 60" embodiments of the pipe may also have the sidewalls slightly angled relative to the inner and outer surfaces, with this angle being approximately 5°.

The pipe of either of the above discussed pipe wall segment structures can be formed into the above discussed pipe structure by a method which comprises the steps of forming the aforementioned pipe wall segment of the structure disclosed above, spirally winding around an axis an elongated strip of the pipe wall segment, and causing adjacent side edge walls of the wound elongated strip to come into contact with and to physically bond to each other so as to form a finished pipe having generally continuous smooth inner and outer wall surfaces. The pipe so made is relatively lightweight compared to plastic pipe of similar outer dimension in the prior art.

Additionally, the pipe exhibits high resistance to deflection. Still further, the pipe can be manufactured so as to be both structurally stable and aesthetically pleasing. For example, in pipes having the large outer diameters discussed above, it is believed that pipe walls of approximately the same strength and length could be made alternatively by thickness being greater than the second thickness. Additionally, the sidewall includes a plurality of secondary internal cells. Furthermore, the primary internal cells are preferably of a circular cross-section and the secondary internal cells are of a generally triangular cross-section.

It is the primary object of the present invention to provide a pipe construction which while using significantly less plastic still results in a structurally stable pipe. An important aspect of the invention is the inclusion in the pipe wall of a plurality of primary and secondary apertures.

Another objective of the present invention is to provide a method for making pipe of the improved pipe wall segment construction.

Other objects and advantages of the invention will be apparent from the following description, the accompanying drawings, and the appended claims.

surface, a bottom surface, a pair of side edge walls, a plurality of primary internal cells, a plurality of secondary internal cells with at least one secondary internal cell being adjacent two primary internal cells, and at least two end apertures, each of said end apertures directly adjacent one of said side edge walls, each of said primary internal cells being larger in size than each of said end apertures, said side edge walls being parallel to each other and extending in a plane from said top surface to said bottom surface, said pipe when formed having said top surface of said pipe wall segment become the inner sidewall of said pipe and said bottom surface of said pipe wall segment become the outer sidewall of said pipe.

2. The pipe according to claim 1 wherein said primary internal cells are of a circular cross-section.

3. The pipe according to claim 1 wherein said secondary internal cells are of a generally triangular cross-section.

4. The pipe according to claim 1 wherein said primary internal cells are of a circular cross-section, and said secondary internal cells are of a generally triangular cross-section.

5. The pipe according to claim 1 wherein said pipe wall segment side edge walls are slightly angled relative to said top surface and said bottom surface.

6. The pipe according to claim 5 wherein said pipe wall segment side edge walls are angled approximately 5° from vertical.

7. A plastic pipe made of a helically wound plastic pipe wall segment, said pipe wall segment comprising a top surface, a bottom surface, a pair of side edge walls, a plurality of primary internal cells, a plurality of secondary internal cells with at least one secondary internal cell being adjacent two primary internal cells, and at least two end apertures, each of said end apertures directly adjacent one of said side edge walls, each of said primary internal cells being larger in size than both said end apertures and said secondary internal cells, said side edge walls being parallel to each other and extending in a plane from said top surface to said bottom surface, said side edge walls being slightly angled relative to the top surface and bottom surface, said pipe when formed having said top surface of said pipe wall segment become the inner sidewall of said pipe and said bottom surface of said pipe wall segment become the outer sidewall of said pipe.

8. The pipe according to claim 7 wherein said pipe wall segment primary internal cells are of a circular cross-section.

Figure 1:
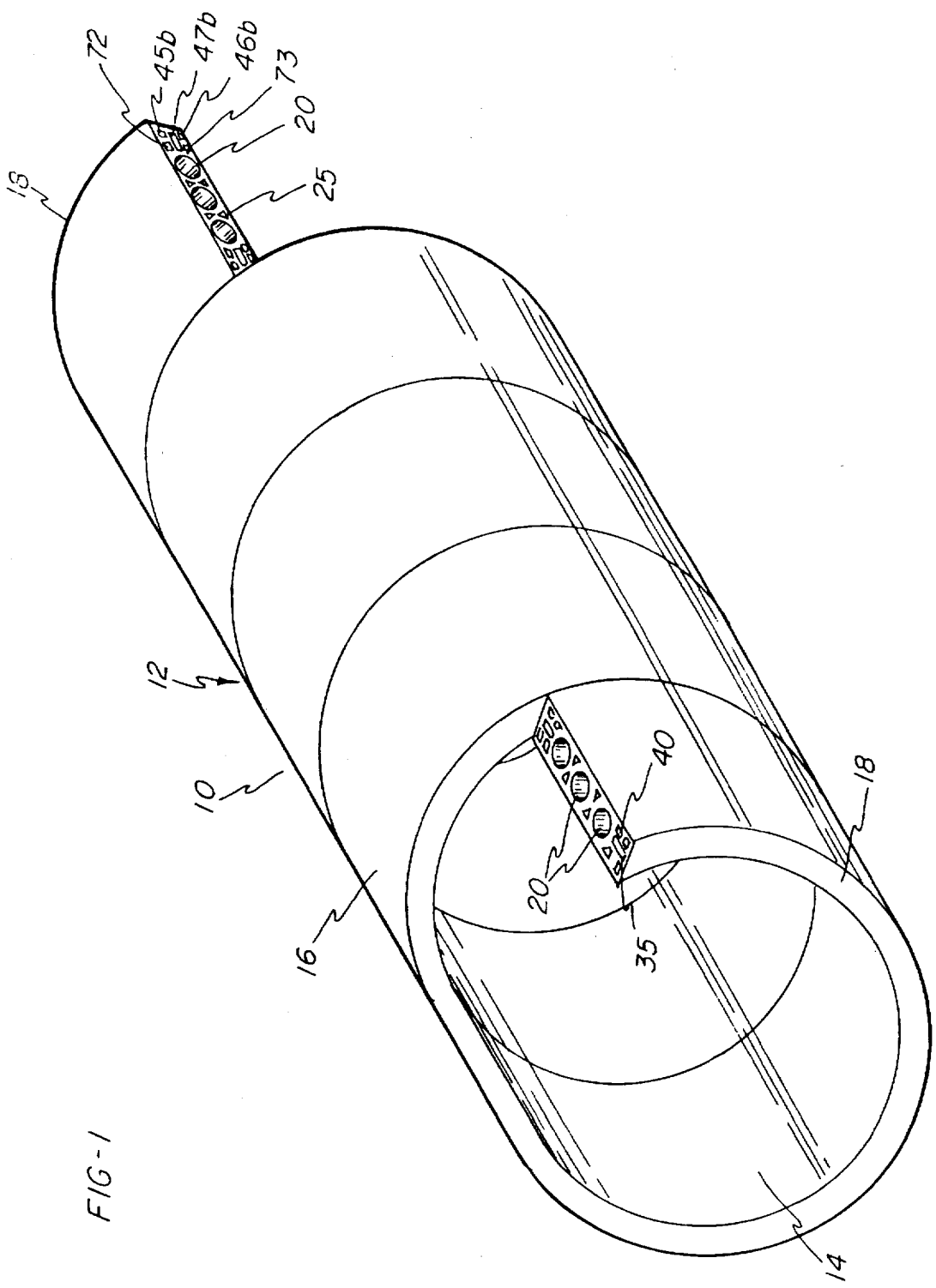
FIG. 1 is a perspective view of a pipe formed from the pipe wall segment of the present invention.
Figure 2:
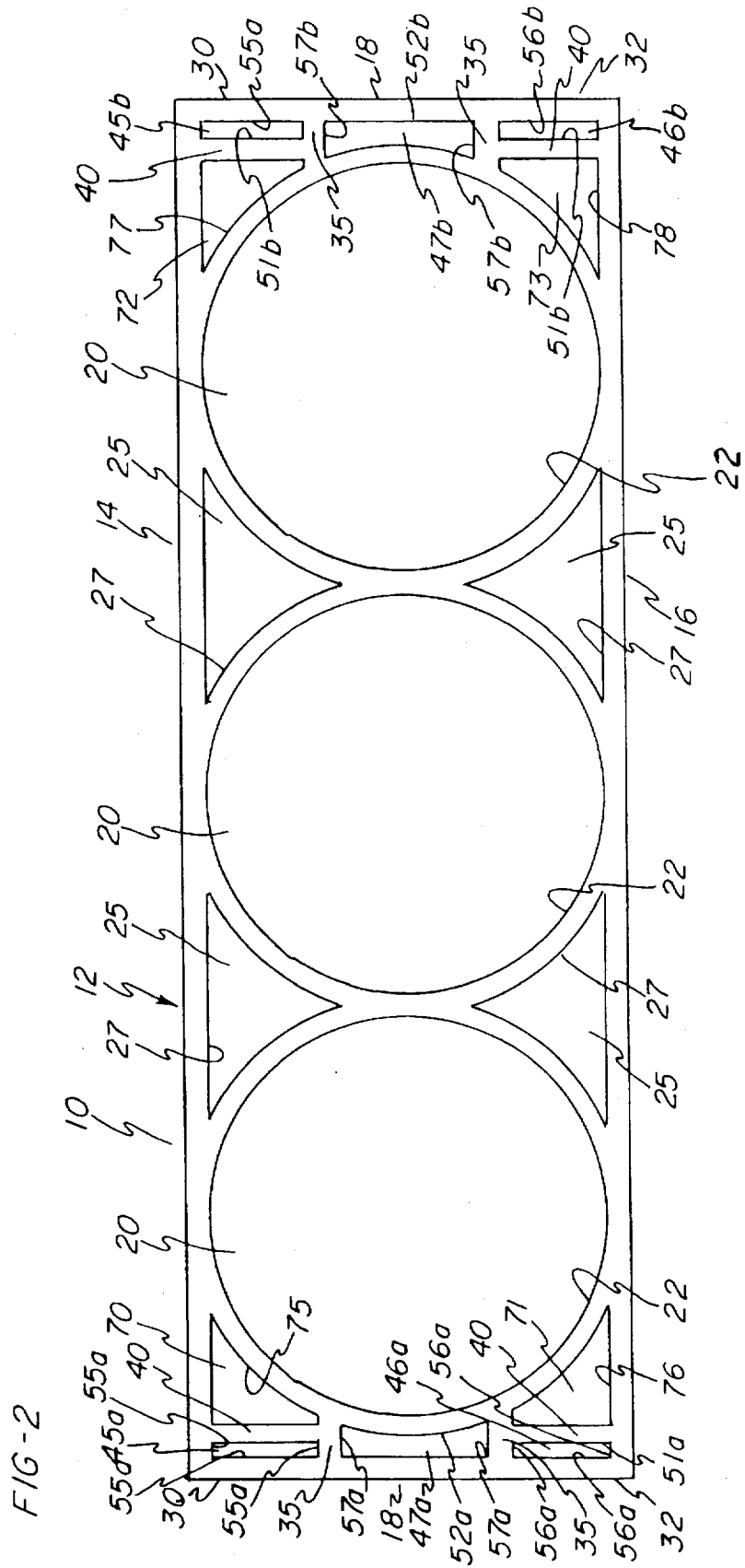
Figure 3:
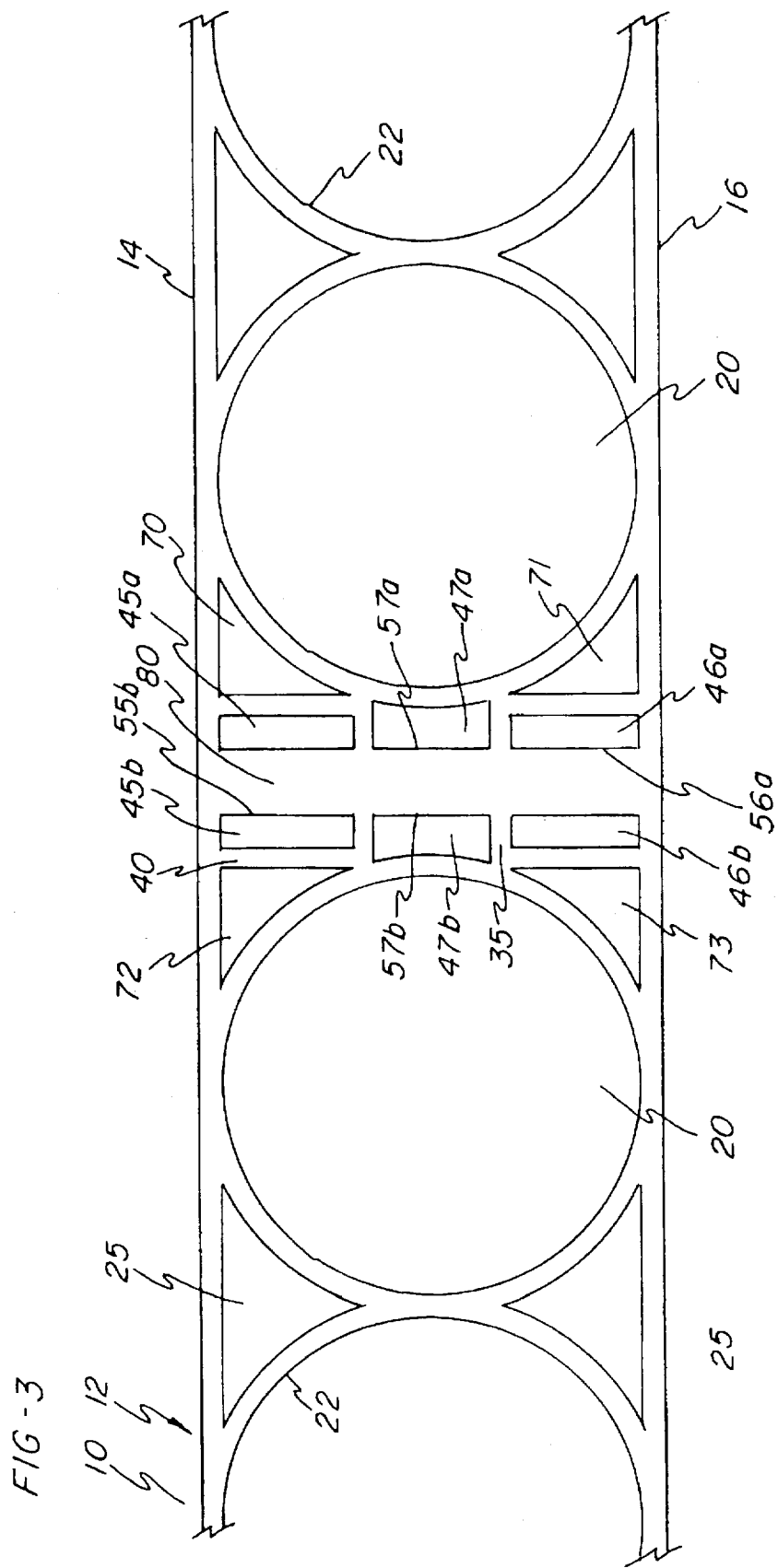
Figure 4:
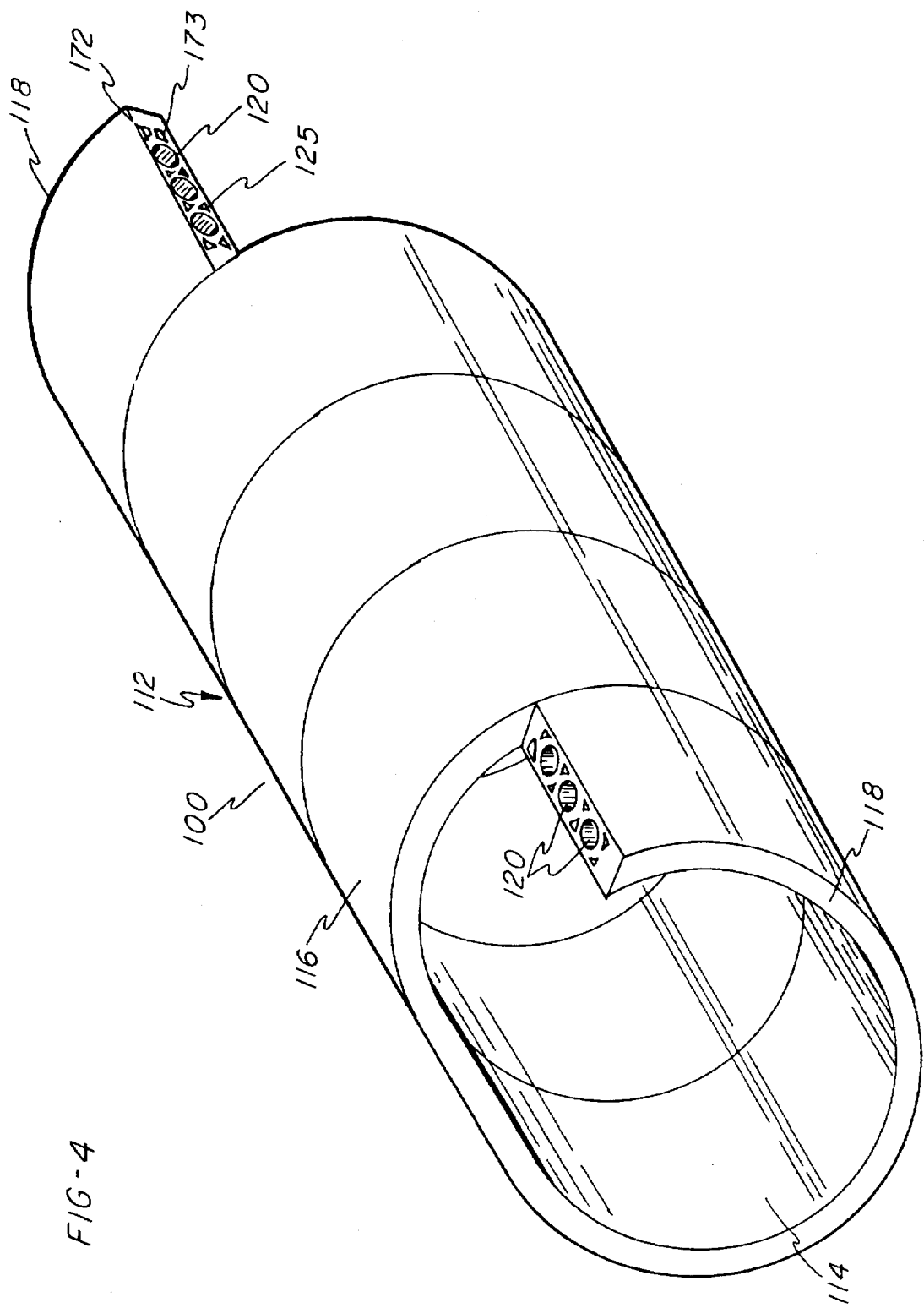
Figure 5:
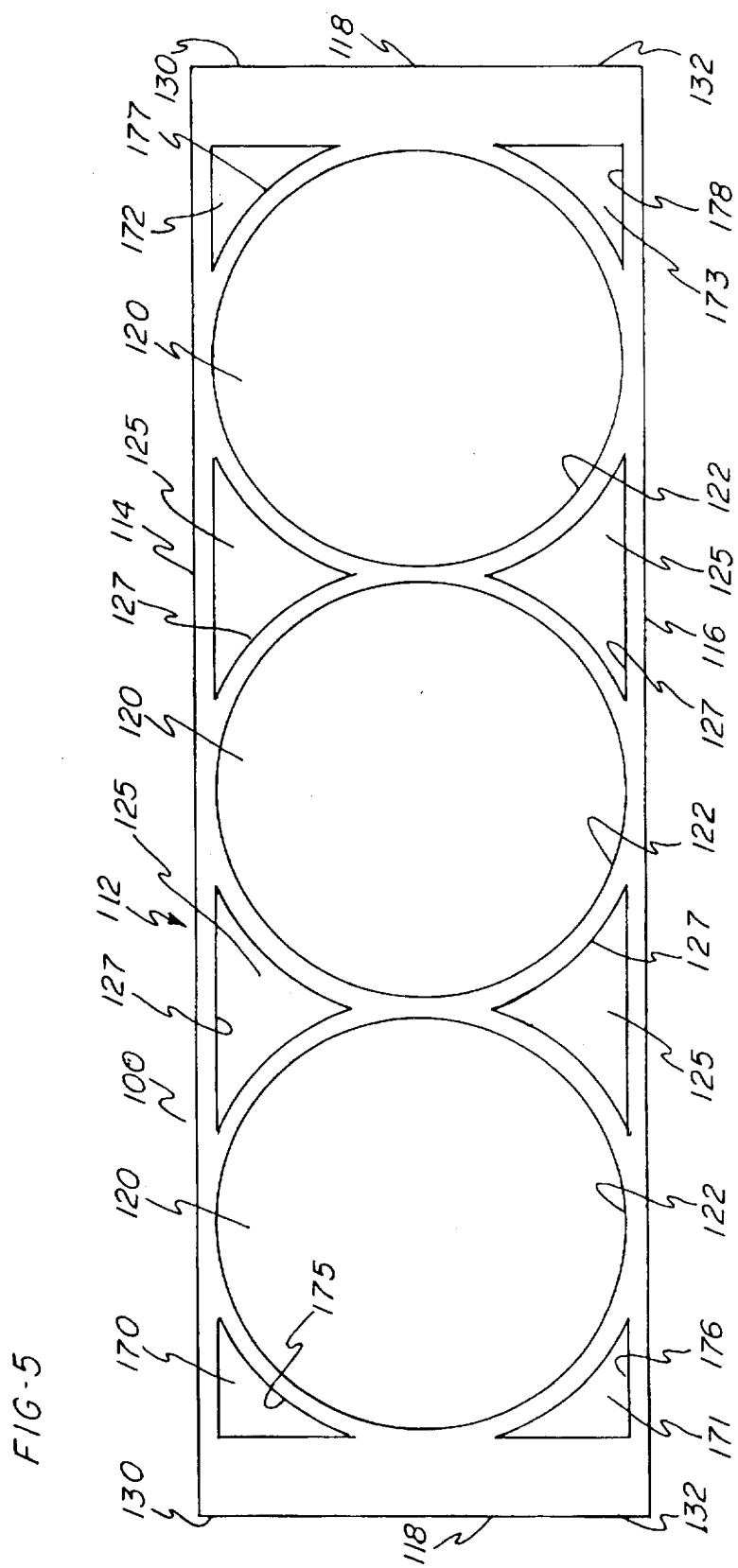

9. The pipe according to claim 8 wherein said pipe wall ary internal cells 25 has a cell surface wall 27. As can be seen best in FIGS. 2 and 3, the secondary internal cells are roughly triangular in cross-section. With respect to the sidewalls 18, FIG. 2 discloses that each sidewall 18 is comprised of a top portion 30, which is directly adjacent the inner surface 14, and a bottom portion 32 which is directly adjacent the outer surface 16.

The pipe wall segment structure of this invention also includes a plurality of collapsible ribs 35, preferably four in number. The collapsible ribs 35 extend between the sidewall 18 and the cell surface wall 22 of that primary internal cell 20 which is adjacent to the sidewall. As mentioned above, preferably there are four of these collapsible ribs, although the pipe wall segment could be fabricated from as few as two, such that at least one collapsible rib projects inwardly from each of the side edge walls 18. The pipe wall segment structure of this invention also includes a plurality of internal flanks 40. Preferably a pair of internal flanks are positioned inwardly of each side edge wall, and oriented parallel thereto. In each pair, one intersects and is Perpendicular to 14. The pipe according to claim 11 wherein said secondary internal cells are of a generally triangular cross-section.

15. The pipe according to claim 11 wherein said primary internal cells are of a circular cross-section, and said secondary internal cells are of a generally triangular cross-section.

16. The pipe according to claim 11 wherein said pipe wall segment side edge walls are slightly angled relative to said top surface and said bottom surface.

17. The pipe according to claim 16 wherein said pipe wall segment side edge walls are angled approximately 5° from vertical.

18. The pipe according to claim 11 wherein each of said primary internal cells are larger in size than each of said end apertures.

19. The pipe according to claim 11 wherein a primary internal cell is directly adjacent an end aperture.

20. The pipe according to claim 11 wherein each of said primary internal cells are larger in size than each of said end apertures, and a primary internal cell is directly adjacent an end aperture.

* * * * *